United States Patent [19]

Merlo

[11] 4,246,469
[45] Jan. 20, 1981

[54] MICROWAVE SEED SENSOR

[75] Inventor: Angelo Merlo, Sterling Heights, Mich.

[73] Assignee: Dickey-john Corporation, Auburn, Ill.

[21] Appl. No.: 958,730

[22] Filed: Nov. 8, 1978

[51] Int. Cl.$^3$ .............................................. B65G 51/36
[52] U.S. Cl. ..................................... 235/92 PK; 111/1
[58] Field of Search ...................... 235/92 PK, 98 R; 73/194 A, 194 E; 324/58.5 C, 58.5 B; 111/1

[56] References Cited

U.S. PATENT DOCUMENTS

| | | | |
|---|---|---|---|
| 3,537,091 | 10/1970 | Schenkenberg | 235/92 PK |
| 3,723,989 | 3/1973 | Fathauer et al. | 235/92 PK |
| 3,881,353 | 5/1975 | Fathauer | 235/92 PK |
| 3,883,798 | 5/1975 | Free | 324/58.5 C |
| 3,928,751 | 12/1975 | Fathauer | 235/92 PK |
| 3,964,041 | 6/1976 | Hinds | 235/92 PK |
| 4,012,622 | 3/1977 | Boys | 235/92 PK |
| 4,054,779 | 10/1977 | Wilke | 235/92 PK |

OTHER PUBLICATIONS

L. W. Hrubesh, "A Simplified Microwave Instrument for Measuring Particle Volumes and Densities", Rev. Sci. Instrum., vol. 45, No. 1, Jan. 1974, pp. 125-126.

Primary Examiner—Joseph M. Thesz
Attorney, Agent, or Firm—Trexler, Wolters, Bushnell & Fosse, Ltd.

[57] ABSTRACT

A microwave seed sensor produces an output signal in response to the passage of each seed through a seed planting tube or conduit forming a path of travel for seeds, as in a seed planting machine. The microwave seed sensor comprises a housing of predetermined dimensions defining a waveguide for supporting propagation of a standing wave pattern of predetermined order at a predetermined microwave frequency. The housing includes a tubular portion for receiving the seed conduit, so that the seed conduit and waveguide intersect to define a seed viewing area where the path of travel in the conduit is in registry with the waveguide. This seed viewing area is of predetermined dimension in the direction of the path of travel of seeds through the conduit for resolution of individual seeds by the microwave seed sensor so that seeds may be counted. The predetermined dimensions of the seed sensor housing are such that the microwave energy is substantially confined within the waveguide, preventing any leakage of microwave energy into the seed conduit, except in the seed viewing area.

14 Claims, 8 Drawing Figures

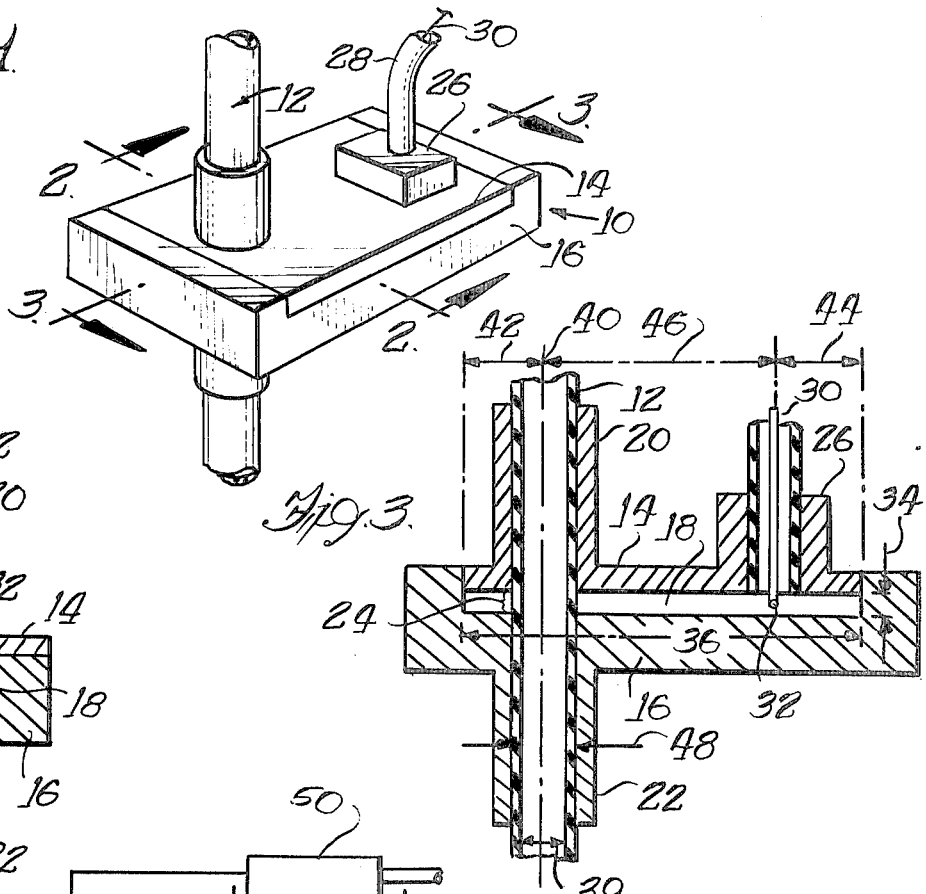
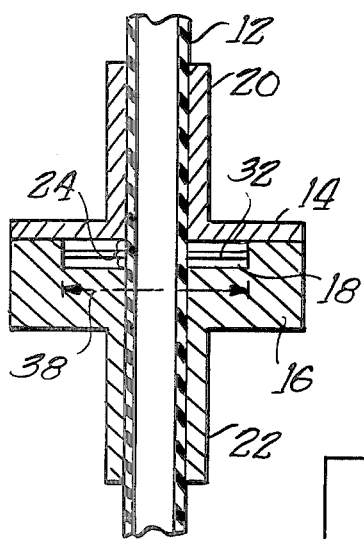
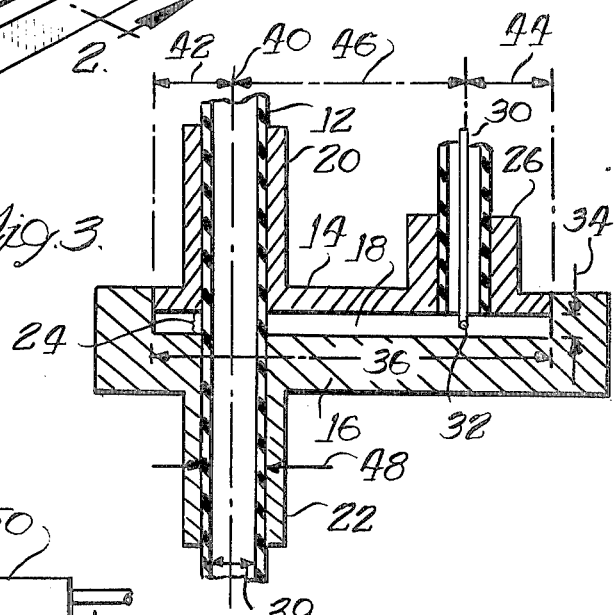
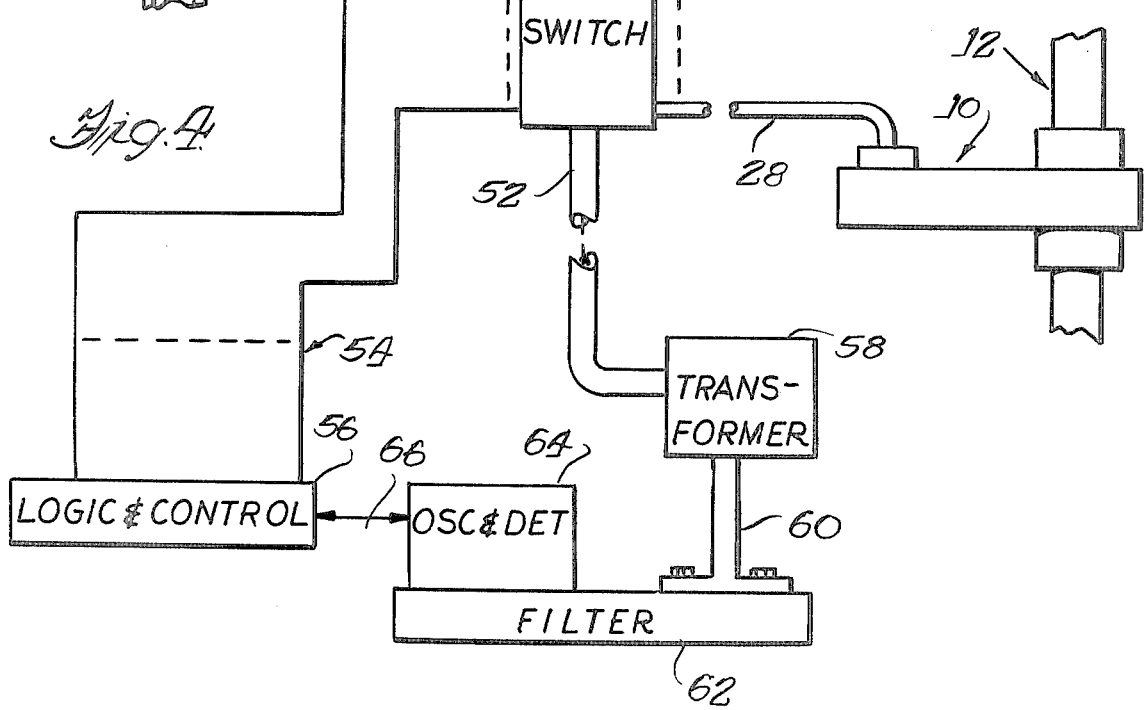

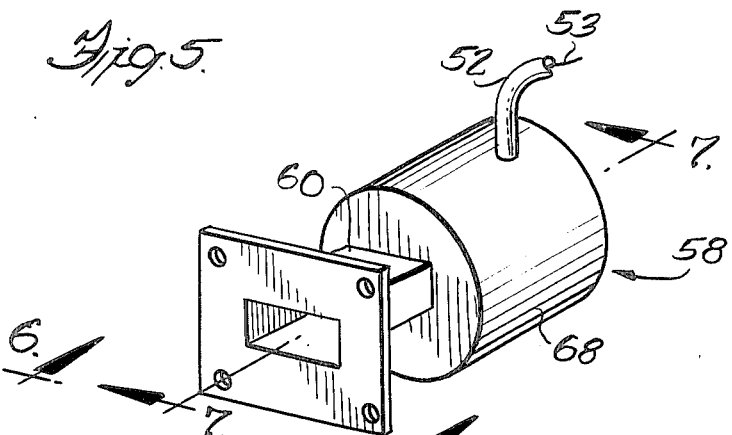
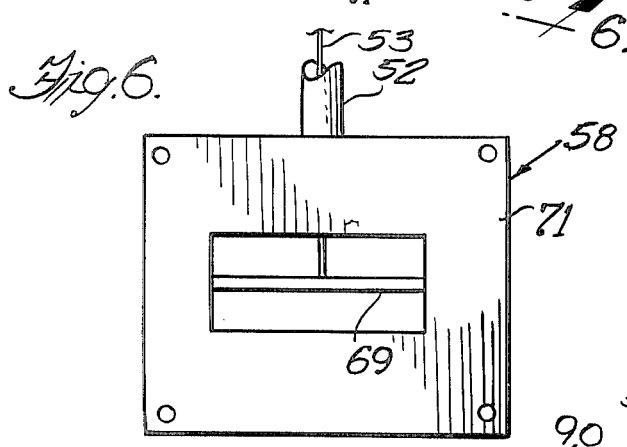
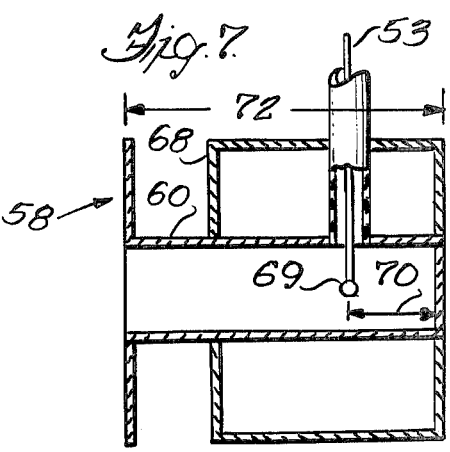
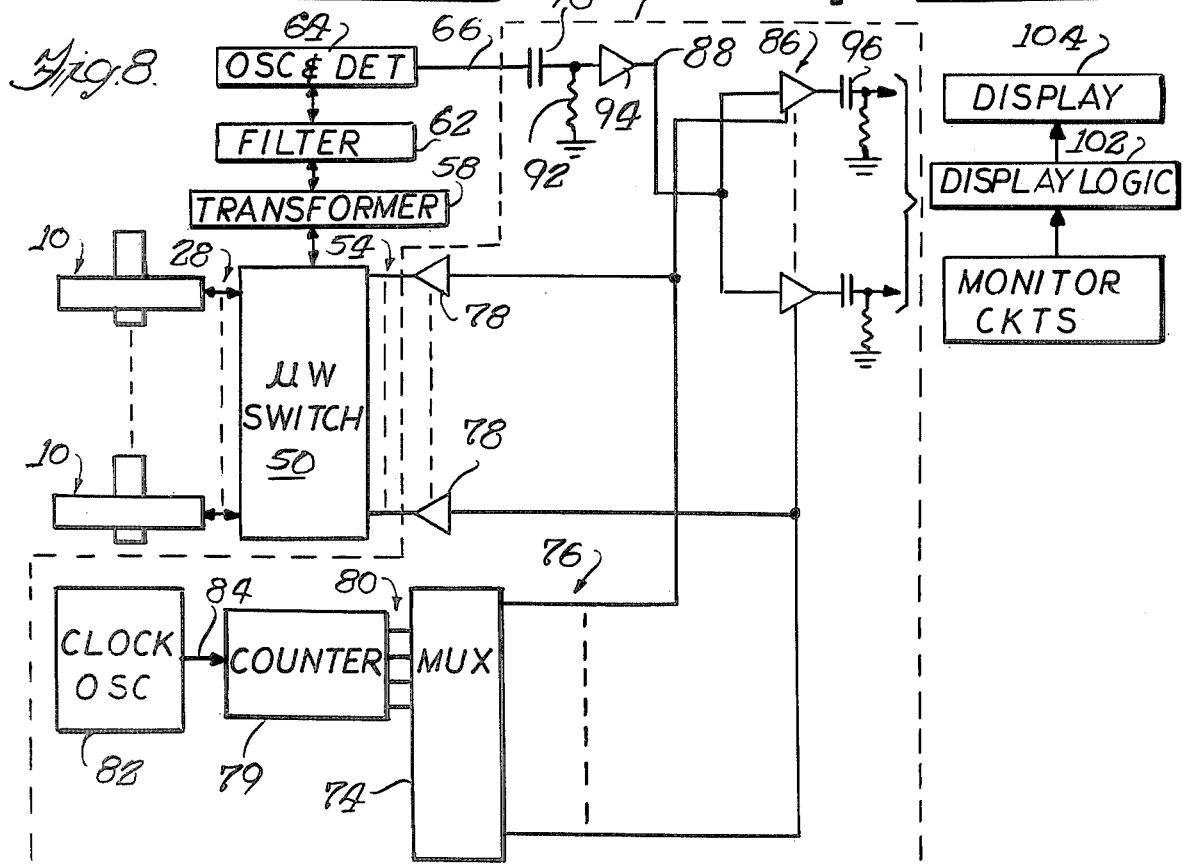

MICROWAVE SEED SENSOR

BACKGROUND OF THE INVENTION

This invention is directed generally to the sensing or detection arts, more particularly to novel and improved apparatus for sensing the passage of discrete articles through a given portion of a given path of travel. While the invention may find a plurality of useful applications, the disclosure will be facilitated by addressing the specific problem of accurately detecting the passage of individual seeds through a seed planting tube, conduit or chute of a seed planting apparatus, so that the number of seeds planted may be accurately counted.

As is well known, a farmer engaged in mechanized planting of various seeds utilizes a planting machine pulled behind a tractor. Such planting machines usually include a plurality of spaced apart planting units which are supplied with seeds from one or more hoppers or containers so that a plurality of rows of seeds may be planted at one time. Numerous useful monitoring systems have been disclosed in the prior art for maintaining a count of the seeds planted by such a planting machine and providing useful indications or read-outs such as seed population and the like to an operator. However, it will be recognized that the accuracy of such counting, computing and indicating apparatus is dependent upon the accuracy and reliability of the sensing device or devices utilized therewith. In practice, a single sensing device is associated with each of the seed planting conduits or chutes of the multi-row planting machine, to provide an output signal in response to the passage of each seed therethrough.

Over the course of development of such seed sensors, a number of approaches have been developed. The earliest of these approaches utilized a sensitive mechanical switch having an actuator member placed in the flow path of the seeds within the seed chute or conduit. Such sensor devices are shown, for example, in U.S. Pat. No. 2,907,015 to Young; in U.S. Pat. No. 3,527,928 to Ryder et al; and in U.S. Pat. No. 3,632,918 to Anson et al. As the seed sensing art developed further, photosensitive devices were found to be somewhat more reliable in operation than the mechanical switches, whereby a number of sensors were constructed utilizing a light beam and a photosensitive device in optical alignment at opposite sides of the seed chute or conduit. In this arrangement, the passage of a seed through the conduit and between the light beam and photosensitive device produced a characteristic output signal which could be monitored to maintain a count of the seeds passing through that seed planting tube or chute. Such devices are shown, for example, in U.S. Pat. No. 3,537,091 to Shenkenburg; in U.S. Pat. No. 3,723,989 to Fathauer; and in U.S. Pat. No. 3,974,377 to Steffen. These latter photosensitive types of seed sensing devices are the type most widely used in the art today. However, a number of problems have been encountered with such photosensitive devices. The foregoing Fathauer and Steffen patents offer solutions to some of these problems, without abandoning the use of a photosensitive sensing device. Specifically, it is well known that dirt, dust or the like may enter the seed planting conduit or tube over a period of time, and both obscure the light source and interfere with the reception of the light beam by the photosensitive device. Consequently, such dirt or dust can inhibit proper operation of this type of sensor, causing a failure to detect the passage of seeds. Moreover, it has become a common practice for farmers to utilize seeds which have been pretreated or coated with various insecticides or liquid fertilizers. Such substances often are deposited in the tube or conduit as numerous seeds pass therethrough, thereby causing a build up of material on the inner walls of the seed conduit or tube. Such a build up of relatively viscous material will similarly obscure the light source and/or photosensitive device, thereby interfering with the detection of seeds.

In addition to the aforementioned improvements of Fathauer and Steffen in photosensitive sensing systems, intended to overcome these problems, an alternative arrangement in the form of an ultrasonic sensing apparatus has been devised, as disclosed in U.S. Pat. No. 3,881,353 to Fathauer.

While the foregoing seed sensor devices have made considerable advances in overcoming the previously mentioned problems, at least one additional problem stills remains. It will be recognized that in the mechanized planting of seeds, relatively large numbers of seeds, ie. large seed populations, are planted in relatively short periods of time. This necessitates seeds being discharged from each seed planting unit or chute in rapid succession as the seed planting machine moves over the field to be planted. Moreover, planting machines commonly in use generally are equipped with eight to sixteen such planting units, and in some cases as many as twenty-four. Accordingly, multiplexing methods have been utilized to accommodate a corresponding number of seed sensors. However, such multiplexing must be accomplished at relatively high speed if a running count is to be obtained from all of the seed sensors simultaneously. This in turn requires that the seed sensing device utilized have a very fast response time, so that it produces an output signal within a very short time of the passage of a seed. Moreover, the seed sensing device utilized must also exhibit a fast recovery time in order to produce a separate and discrete output signal in response to each of the seeds passing through its associated conduit. A related problem is that of distinguishing between two or more seeds which pass the sensor in relatively close proximity so as to maintain an accurate seed count. The foregoing problems may collectively be characterized as a problem of achieving adequate resolution in the sensing device.

OBJECTS AND SUMMARY OF THE INVENTION

Accordingly, it is a general object of this invention to provide a new and improved sensor apparatus for accurately and reliably sensing the passage of discrete articles along a given path of travel.

A more specific object of the invention is to provide a new and improved sensor apparatus in accordance with the foregoing object which is especially adapted for detecting the passage of seeds through a planting chute of a seed planting machine.

Another object is to provide a novel and improved seed sensor apparatus, in accordance with the foregoing objects, which is further adapted to be relatively insensitive to the accumulation of dirt, dust or other materials such as coatings used to treat seeds, on the inner walls of the seed delivery conduit or chute.

Yet another object is to provide a new and improved seed sensor apparatus, in accordance with the foregoing objects, which is further capable of sufficiently rapid response and recovery times so as to be suitable for monitoring a relatively high rate of flow of seeds or other discrete articles, and further suitable for use in conjunction with a system where multiplex scanning is utilized to monitor a plurality of seed sensing devices.

Still another object is to provide a seed sensor apparatus, in accordance with the foregoing objects, which is further adapted to provide a relatively high degree of resolution for accurately and reliably detecting each individual seed as it passes through a seed viewing area in the associated seed delivery conduit to be planted, while not responding to other seeds not in the seed viewing area, but which may be in relatively close proximity thereto.

In accordance with the foregoing objects and briefly, the present invention provides a microwave seed sensor comprising waveguide means for supporting and confining propagation of a standing wave pattern of predetermined order at a predetermined microwave frequency. Mounting means are provided for receiving the seed delivery conduit or tube, so that the seed delivery conduit intersects the waveguide means. This intersection defines a seed viewing area in registry with a predetermined portion of a path of travel defined by the seed delivery conduit. The seed viewing area is of a predetermined dimension in the direction of the path of travel of seeds through the conduit for achieving resolution of individual seeds as they pass through the portion of the path of travel in registry with the seed viewing area.

BRIEF DESCRIPTION OF THE DRAWINGS

Other objects, features and advantages of the invention will be more readily understood upon consideration of the following detailed description of the illustrated embodiment, together with the accompanying drawings wherein:

FIG. 1 is a perspective view of the novel seed sensing device of the invention, mounted in association with a seed delivery tube, conduit or chute;

FIG. 2 is a sectional view taken generally along the line 2—2 of FIG. 1;

FIG. 3 is a further sectional view, taken generally along the line 3—3 of FIG. 1;

FIG. 4 is a diagrammatic illustration of the seed sensor of FIGS. 1 through 3 embodied in a microwave generation and detection system adapted to cooperate with a plurality of such seed sensors;

FIG. 5 is a perspective view of a microwave waveguide-to-coaxial cable transformer useful in the system of FIG. 4;

FIG. 6 is a view taken generally along the line 6—6 of FIG. 5;

FIG. 7 is a sectional view taken generally along the line 7—7 of FIG. 5; and

FIG. 8 is a circuit schematic, in block diagrammatic form, illustrating the seed sensor of this invention embodied in an exemplary seed monitoring system.

DETAILED DESCRIPTION OF THE ILLUSTRATED EMBODIMENT

Referring now to the drawings, and initially to FIG. 1, a novel microwave seed sensor designated generally 10, constructed in accordance with features of the invention, is illustrated mounted in conjunction with a seed delivery conduit or tube 12. The conduit 12 is one of a plurality of such conduits associated with a conventional multi-row seed planting machine (not illustrated). This microwave seed sensor 10 advantageously comprises a waveguide adapted to support and confine propagation of a standing wave pattern of predetermined order at a predetermined microwave frequency.

The use of microwave energy in the sensing and detection arts is generally known. However, microwave devices have heretofore been primarily relegated to such applications as burglar alarm or intrusion detection systems, in which it is desired to detect any physical movement within a relatively large area. Accordingly, it will be recognized that such devices are not useful for detecting the passage of seeds through a relatively small conduit such as the tube or conduit 12, wherein the sensing device must respond only to objects moving within a relatively small area or volume. However, microwave sensing devices have been modified for use in this latter environment in at least one instance. Specifically, the copending application of Raymond D. Amburn, Ser. No. 750,309, now abandoned, discloses a microwave seed detecting device for detecting seeds in a seed planting conduit of a planting machine. This copending application is owned by the Assignee of record of the present application. The system disclosed by Amburn involves the use of a relatively "lossy" sensing tube, interposed in the seed delivery tube or conduit such as the conduit 12. Mircowave power is launched into the sensing tube by use of a simple microwave loop antenna, whereby passage of seeds through the sensing tube causes a response in the form of a disturbance in the microwave field. It will be recognized, however, that the system disclosed by Amburn is directed to the problem of sensing the passage of seeds for the purpose of energizing a magnetic treatment device located further down the conduit (in the direction of travel of seeds) from the sensing device. Accordingly, the foregoing application is not concerned, as such, with maintaining an accurate count of seeds, but rather of reliably triggering the magnetic field producing apparatus, so as to magnetically treat seeds passing thereby in the seed delivery conduit or tube. Accordingly, the microwave sensing device disclosed by Amburn does not require a particularly high degree of resolution, such that its response is limited to a single seed, where more than one seed is present in the conduit or tube. In contrast, the present invention, as will hereinafter be described, is relatively insensitive to seeds in the seed delivery conduit 12 which are not within a relatively small area or volume defined by the intersection of the conduit 12 with the sensing device 10. As such, it will be recognized that the device of the copending Amburn application is useful for the sensing of seeds per se, while the present invention is particularly directed to the problem of obtaining an accurate and reliable count of the seeds sensed thereby.

Returning now to a consideration of FIGS. 1 through 3, the microwave sensor 10, generally speaking, comprises two housing halves or members 14 and 16 which cooperatively engage to define an interior volume 18. This volume 18 forms a waveguide of suitable dimensions for supporting and confining propagation of a standing wave pattern of predetermined order at a predetermined microwave frequency. The housing halves 14 and 16 also include mounting means in the form of tubular guides or channels 20, 22, which communicate with the volume 18 and are aligned at respective top and bottom sides of the assembled housing halves 14 and 16 for surroundingly engaging the seed delivery tube or conduit 12. Accordingly, it will be seen that a portion of the seed delivery conduit 12 intersects the waveguide 18, defining a cross-section area of the waveguide 18, generally designated by reference numeral 24.

A mounting bracket 26 on the housing half 14 is configured for receiving a conventional coaxial cable 28 to deliver electromagnetic energy at a microwave frequency to the interior of the waveguide 18. Specifically, a center conductor 30 of the cable 28 is electrically joined to a wire conductor 32 which extends across the waveguide 18. This conductor 32 delivers microwave energy to the waveguide, acting in effect as an antenna.

Turning now to a more specific consideration of the dimensions and properties of the waveguide 18, the housing halves 14 and 16 define a substantially rectilinear space or volume comprising the waveguide 18. The waveguide 18 thus has readily definable length, height and width dimensions, respectively. The height is indicated by reference numeral 34, the width by reference numeral 36 and the length by reference numeral 38. It is known that the dimensions of a rectangular waveguide such as the waveguide 18 may be predetermined so as to support a standing wave pattern of the lowest order at a predetermined microwave frequency, to the exclusion of all other orders of wave patterns. (In the literature, this lowest order is commonly referred to as the $TE_{10}$ (or $H_{10}$) order.) This is accomplished by adjusting the width dimension 38 so as to be above the cut-off wavelength for this lowest order mode at the desired microwave frequency, but below the cut-off wavelength for all higher order modes. In determining this cut-off wavelength, only the width dimension 38 need be considered, the length 36 and height 34 having no effect, under ideal conditions, on the cut-off wavelength for lowest mode in a rectangular waveguide. In accordance with an important feature of the invention, therefore, the height dimension 34 may be chosen advantageously so as to define a relatively small "seed viewing area" corresponding to the area 24 in the wavelength 18, where it intersects the seed conduit or tube 12. Advantageously, this relatively small seed viewing area 24 is such that a surprisingly high degree of resolution is experienced in detecting individual seeds passing through the conduit 12. That is to say, the microwave energy in the waveguide 18 is noticeably affected by the presence of seeds in the portion of the conduit 12 which is substantially in alignment with the seed viewing area 24, but is relatively insensitive to seeds present in other portions of the seed delivery conduit or tube 12. Consequently, as it is the width dimension 38 of the waveguide 18 that is primarily determinative of the properties of the standing wave pattern propagated therein, the height dimension 34 may be chosen at a suitably small value to minimize the extent of the viewing area or intersections area 24. In the illustrated embodiment the height 34 is 0.10 inches. Thus, a surprisingly high degree of resolution is afforded by this setting of the height dimension 34 at a value suitable for viewing seeds individually as they pass through the portion of the conduit 12 adjacent or in registry with the viewing area 24. As a further advantage, the viewing area 24 extends across the entire width dimension, designated by reference numeral 38, of the seed delivery tube or conduit 12. Thus there are no "blind spots" in the sensor 10 as occurred in some prior art devices utilizing photosensors or mechanical switches.

In accordance with another feature of the invention, the length dimension 36 of the waveguide 18 is chosen to maximize the signal output of the sensor 10 in response to passage of a seed in registry with the seed viewing area 24 as described above. This is accomplished as follows. In the preferred embodiment illustrated, the conduit or tube 12 comprises a generally cylindrical tube composed of a suitable dielectric or plastic material. Accordingly, this cylindrical tube or conduit 12 defines a central axis designated generally by the reference numeral 40. The length 36 is chosen to be substantially equal to an integral number of guide wavelengths of the standing wave pattern propagated within the waveguide 18. By guide wavelength is meant the characteristic wavelength of the predetermined frequency of microwave energy which the standing wave pattern assumes within the guide 18. It will be recognized that this guide wavelength is of a different value than the wavelength of the same microwave frequency propagated in free air space. This guide wavelength is also determined substantially by the cut-off wavelength, previously mentioned, which is in turn dependent only upon the width dimension 38 of the guide (for the lowest order standing wave pattern herein utilized), as discussed above. Consequently, the seed conduit mounting means 20 and 22 are positioned so that the central axis 40 of the conduit 12 is substantially at a maximum of the standing wave pattern propagated in the waveguide 18. Thus, a dimension designated 42 corresponds to an odd integral number of quarter guide wavelengths from the left hand end of the waveguide 18, as illustrated in FIG. 3, to the central axis 40 of the conduit 12. Similarly, the excitation element or wire 32 lies in a plane which is at another maximum of the standing wave pattern in the guide 18. This plane is an odd integral number of quarter guide wavelengths from the opposite or right hand side of the guide 18, as indicated by reference dimension 44. Consequently, the distance between the parallel planes defined by excitation wire or element 32 and the central axis 40 of the conduit 12 is substantially an integral number of half guide wavelengths.

For purposes of defining a specific embodiment of the invention, the relative dimensions thus far defined in terms of guide wavelength are chosen with the integral numbers or odd integral numbers mentioned above being set equal to unity. Specifically, in the preferred embodiment illustrated, the width dimension 38 is somewhat above one half the cut-off wavelength for the $TE_{10}$ mode of microwave energy at a frequency of 10.525 gigahertz (Ghz.) This microwave frequency is also referred to as a 2.85 centimeter wave, which is the wavelength thereof in free air space. It is known in the art that propagation of a $TE_{10}$ or lowest order mode of a given microwave frequency, to the exclusion of higher order modes, occurs in a rectangular guide when the width of the waveguide is somewhat greater than one half the wavelength thereof. In the illustrated embodiment, the dimension 38 is 1.040 inches. The guide wavelength may be determined from the cut-off wavelength and from the properties of the interior of the waveguide. In the waveguide 18, the impedance of the guide including the effects of the excitation wire 32 and its lead 30 and of the portion of the seed conduit 12 in the guide 18 must be taken into account. In the illustrated embodiment, the length dimension 36 is set at substantially one guide wavelength or 1.450 inches. Consequently, the dimensions 42 and 44 are each set at substantially one quarter of this guide wavelength and the dimension 46 at one half of this guide wavelength.

Advantageously, the internal cross-sectional dimensions of the tubular mounting sections 20 and 22, are substantially below the cut-off wavelength for the lowest order mode of the microwave frequency utilized.

In accordance with a preferred form of the invention, the seed conduit 12 and the tubular mounting members or channels 20 and 22 are substantially cylindrical, whereby the members 20 and 22 define waveguides of circular cross section, as known in the art. In the illustrated embodiment, it will be remembered that this microwave frequency is 10.525 Ghz, whereby the inner diameter 48 of mounting portions 20 and 22 is advantageously chosen as substantially 0.300 inches. This dimension is below the cut-off wavelength of the lowest order mode in a cylindrical guide and therefore of all modes of propagation of the 10.525 GHz microwave energy. Accordingly, the standing wave pattern of microwave energy is substantially confined by the waveguide 18, and excluded from the portions 20 and 22. Thus, microwave energy is not propagated in either direction in the seed conduit or tube 12. It will be appreciated that this feature further contributes in assuring that the seed sensor 10 is sensitive only to the passage of seeds through the portion of the conduit 12 adjacent to or in registry with the viewing area 24, having substantially no sensitivity or response to seeds passing through or located in other portions of the conduit 12 either above or below the waveguide 18. Consequently, the aforementioned unexpectedly high resolution of the sensor 10 for obtaining an accurate count of seeds is further enhanced by this feature as well.

Having now described the novel seed sensor 10 of the invention, it will be instructive to briefly review a specific microwave system in which the seed sensor may advantageously be utilized. Referring now to FIG. 4, the seed sensor 10 of the invention is diagrammatically illustrated in conjunction with microwave energy generating, transmitting and receiving apparatus adapted for use with a multi-row seed planting machine.

A plurality of similar seed sensors 10, constructed in accordance with the invention, are mounted to a plurality of seed delivery tubes or conduits 12 associated with the multi-row seed planting machine (not shown). A corresponding plurality of cables such as the coaxial cable 28 deliver microwave energy to the respective microwave sensors 10, in the manner heretofore described with reference to FIGS. 1 through 3. These cables 28 are fed from a microwave scanner switch 50 which receives microwave energy at a single input 52 and redirects it to one of the plurality of cables 28, for energizing the corresponding sensor 10. This microwave scanner switch 50, in the illustrated embodiment, is of the type generally designated Single Pole Multi Throw Switch MT3653 through MT3657 manufactured by Alpha Industries, Inc. 20 Sylvan Road, Woburn, Mass.

The microwave switch 50 has a plurality of control inputs, one for each sensor 10, fed by lines 54 from suitable logic and control circuitry 56 which will be further described hereinbelow. Briefly, the microwave switch 50 is responsive to a control signal on one of the control lines 54 for redirecting microwave energy from the cable 52 to the one of the cables 28 which corresponds to the energized line 54. The cable 52 is fed from a waveguide-to-coaxial cable transformer 58, which will further be described hereinbelow. This transformer 58 has a waveguide input section 60 fed from a microwave filter 62 which is in turn energized from a microwave oscillator and detector 64. The filter element 62 comprises a second harmonic microwave filter of known construction, for eliminating any microwave frequencies which may be present in the signal generated by the oscillator 64, other than the desired 10.525 Ghz signal. A suitable filter for this purpose may be obtained from Racon, Inc. at the same address as given below, under the designation Doppler Radar Filter/Mixer P/N 1004-103-102. In the illustrated embodiment, the microwave oscillator and detector 64 is a Gunn diode or Gunn oscillator source of known configuration set to radiate at approximately 2.85 centimeter wavelength (10.525 Ghz microwave frequency). This particular wavelength (frequency) has been allocated by the FCC for industrial applications. As a specific example, a suitable oscillator and detector 64 may be obtained under part number MA-86501 Doppler transceiver from Microwave Associates, Inc., Burlington, Mass., and is described in their bulletin number 7614B. Other suitable Gunn microwave sources are available from Racon Inc., 8490 Perimeter Road South, Seattle, Wash., 98108, under the designation "Gunn Microwave Source". In operation, it has been found that a disturbance in the standing microwave pattern propagated in the waveguide 18, as for example by the passage of a seed through the conduit 12 adjacent or in registry with the viewing area 24, will cause a substantial variation in the standing wave pattern. This variation is returned or "reflected" through the associated cable 28, the switch 50, and cable 52. The transformer 58 converts the signal variation to a disturbance in the wave pattern in its waveguide portion 60 and in the attached filter 62 at the output of the oscillator and detector 64. This disturbance or variation is externally manifested by a corresponding variation in the electrical signal level at a detector output 66 of the oscillator and detector unit 64. In practice, this detector output is often a biasing voltage input or control terminal of the oscillator and detector 64. Accordingly, the variation in the standing microwave pattern due to passage of a seed is ultimately manifested as a readily detectable electrical signal, which may in practice be observed on the detector output line 66. This line 66 feeds the logic and control circuitry 56, which will be more fully described hereinbelow.

Referring now to FIGS. 5 through 7, the transformer 58 is illustrated in detail. Briefly, the transformer 58 comprises a housing 68 which partially encloses the waveguide member 60 which is of suitable dimension for receiving and propagating the microwave energy from the oscillator 64 via the filter 62. The coaxial cable 52 has a center conductor 53 which is energized by a brass rod 69, which extends across the waveguide member 60, substantially centered with respect to the height thereof, and located substantially one quarter guide wavelength from the closed end of the waveguide 60 as indicated by reference numeral 70. Preferably, the overall length of the guide 60, as indicated by reference numeral 72, is substantially one guide wavelength of the 2.85 centimeter microwave energy. A suitable support or mounting flange 71 is provided for mounting the transformer 58 to the microwave filter element 62.

Referring now to FIG. 8, the microwave elements of FIG. 4 are illustrated in diagrammatic form, together with elements comprising the logic and control circuit 56. While the microwave sensor 10 of the present invention may be utilized in conjunction with a variety of known seed planter monitoring circuits, a specific embodiment of a logic circuit 56 is illustrated for purposes of affording a better understanding of the utility of the invention. This logic circuit 56 includes a multiplexer circuit 74 of the type generally known in the art, for energizing the control lines 54 to the microwave switch 50 in a predetermined repetitive sequence. The lines 54 are energized from multiplexer output lines designated generally 76, via a plurality of suitable buffer elements designated generally 78.

The multiplexer 74 is driven in conventional fashion by appropriate logic signals from a counter circuit 79, via control lines designated generally 80. The counter 79 is energized by a conventional clock oscillator circuit 82 via a line 84. The multiplexer output lines 76 simultaneously feed control inputs of a plurality of sample and hold circuits designated generally 86, which are associated respectively with a plurality of sensors 10 of the invention, as might be utilized on a multi-row planting machine. The sample and hold amplifiers 86 are fed from a common line 88 which is in turn fed from the detector output line 66 of the oscillator and detector 64. A DC filter circuit and buffer comprising a capacitor 90 and resistor 92 and a conventional buffer integrated circuit 94 are interposed between the lines 66 and 88.

In operation, as a control line 76 from the multiplexer energizes the microwave switch 50 to select a particular one of the seed sensors 10, a corresponding one of the sample and hold amplifiers 86 is simultaneously enabled for receiving the detector signal output on the line 66 via the DC filter and buffer elements and line 88. A further DC filter comprising a suitable capacitor 96 and a resistor 98 receives the output of each sample and hold amplifier 86 and feeds the filtered signal to suitable monitoring circuitry 100. This monitoring circuitry 100 may take any of a variety of forms well known in the art for counting the seed signals and/or for performing other signal processing operations in order to compute the number of seeds planted per unit distance, seed population per acre, or other useful parameters for display to an operator of the seed planting machine. The monitoring circuits 100 feed suitable display logic 102 for driving a display unit 104 to provide observable indications to an operator of such parameters. Suitable elements to form such a monitoring circuit 100, display logic 102 and display 104 are generally known in the art, and as they form no part of the present invention, need not be described further herein.

The novel seed sensor of the present invention has been illustrated and described herein with specific reference to the problem of detecting and counting seeds as they are delivered to the ground to be planted from a multi-row seed planting machine. It will be appreciated that the principles of this invention may find application in other situations where discrete articles passing through a defined area are to be detected and counted. While a specific embodiment of the invention has been illustrated and described, the invention is not limited thereto. On the contrary, the invention includes such alternatives, modifications and changes as may become apparent to those skilled in the art, insofar as such alternatives, modifications and changes fall within the spirit and scope of the appended claims.

The invention is claimed as follows:

1. A microwave seed sensor for providing an output signal in response to passage of a seed through tubular conduit means forming a path of travel for seeds, comprising: a rectangular waveguide of predetermined interior width, height, and length, respectively, said predetermined width being a width at least as great as the cross-sectional dimension of said tubular conduit and which supports propagation of a standing wave pattern of predetermined order at a predetermined microwave frequency, tubular mounting means for mounting the waveguide in association with the tubular conduit means to define an intersection between the conduit means and the waveguide, said waveguide height being on the order of the dimension of a seed and defining a seed viewing area in said intersection in registry with a limited, predetermined portion of the path of travel formed by the conduit means, said seed viewing area being oriented so that said predetermined height dimension is in alignment with the direction of the path of travel of seeds through the conduit means for substantially achieving resolution of individual seeds as they pass along the portion of the path of travel in registry with the seed viewing area.

2. A microwave seed sensor according to claim 1 wherein said waveguide comprises a housing of electrically conductive material and substantially defines a predetermined guide wavelength of said standing wave pattern, said predetermined length being substantially equal to an integral multiple of said predetermined guide wavelength, whereby said standing wave pattern comprises a predetermined integral number of half sine variations.

3. A microwave seed sensor according to claim 2 wherein said mounting means is disposed for substantially centering said conduit means about an imaginary logitudinal axis which is parallel to and spaced apart from a first end of said predetermined length by substantially an odd integral multiple of one quarter of said predetermined guide wavelength.

4. A microwave seed sensor according to claim 3 wherein said waveguide means further includes excitation means for exciting the standing wave pattern of predetermined order and predetermined microwave frequency in said waveguide means, said excitation means comprising a wire conductor means disposed substantially at a right angle with respect to said predetermined length and substantially centered with respect to said predetermined height and located substantially a further odd integral multiple of one quarter of said predetermined guide wave length with respect to an opposite end of said predetermined length.

5. A microwave seed sensor according to claim 4 wherein said integral multiple, said odd integral multiple and said further odd integral multiple are each one.

6. A microwave seed sensor according to claim 2 wherein said integral multiple is one.

7. A microwave seed sensor according to claim 1 wherein said tubular mounting means comprises a pair of coaxial substantially cylindrical tubes of electrically conductive material communicating with the interior of said waveguide and each having an interior dimension which is substantially less than the cut-off wavelength for the lowest order of said predetermined microwave frequency for substantially preventing propagation of microwave energy in said path of travel outside of said intersection thereof with the waveguide means.

8. A microwave seed sensor comprising a housing of electrically conductive material defining a substantially rectangular waveguide of predetermined dimensions for supporting and confining microwave energy in a standing wave pattern of predetermined order at a predetermined microwave frequency, substantially excluding propagation of microwave energy of any other order, said housing further including a through aperture of substantially circular cross-section for mounting said seed sensor to a cylindrical seed conduit, said circular cross-section being of predetermined diameter for substantially confining said microwave energy to said rectangular waveguide, the predetermined dimensions of said rectangular waveguide further defining a seed viewing area of dimension on the order of the dimension of a seed in the direction of a path of travel of seeds through said seed conduit, whereby said seed sensor is responsive substantially only to seeds individually as they pass through a portion of said conduit substantially in registry with said seed viewing area, so as to provide a measure of the number of seeds passing through said conduit.

9. A seed monitoring system for a field seed planter, said field seed planter having a plurality of means delivering seeds along predetermined paths of travel to the ground to be planted, said monitoring system comprising a plurality of microwave seed sensors, each mounted in association with one of said paths of travel for seeds to define an intersection between the seed sensor and the associated path of travel, each said microwave seed sensor comprising means defining a rectangular waveguide for supporting and confining microwave energy in a standing wave pattern of a predetermined order and a predetermined microwave frequency, said waveguide defining a seed viewing area in the intersection in registry with a predetermined portion of the path of travel, the seed viewing area being of predetermined dimension in the direction of the path of travel on the order of the dimension of a seed for substantially achieving resolution of individual seeds as they pass along the portion of the path of travel in registry with the seed viewing area.

10. A monitoring system according to claim 9 further including means for generating and detecting microwave energy, and means for sequentially and repeatedly joining said generating and detecting means with each of said plurality of microwave sensors, for substantially continuously and simultaneously monitoring the passage of seeds in all of said paths of travel of said field seed planter.

11. A monitoring system according to claim 9 wherein said means defining a waveguide includes opening means for the passage of said path of travel through the waveguide, said opening means being of predetermined dimension for substantially preventing a propagation of microwave energy therethrough, thereby confining microwave energy to said standing wave pattern in said waveguide.

12. A monitoring system for a field seed planter, said field seed planter having a plurality of means for delivering seeds to be planted along predetermined paths of travel to the ground, said monitoring system comprising a plurality of microwave seed sensors each mounted in association with one of said paths of travel, oscillator and detector means for generating microwave energy, means including scanning means for sequentially and repeatedly delivering said microwave energy to each of said microwave seed sensors in a predetermined order, said oscillator and detector means including a detector output and being responsive to said microwave seed sensors for producing a predetermined output signal at said detector output in response to passage of a seed along one of said paths of travel, a plurality of output circuit means each associated with one of said microwave seed sensors for receiving said detector signal output and joined with said scanning means for channeling said detector output signals through ones of the output circuit means in unison with the scanning of their associated sensor means, and monitoring circuit means for receiving said output signals from the output circuit means and for producing display signals therefrom for driving an operator observable display, wherein said microwave seed sensors each comprise a rectangular waveguide for supporting and confining microwave energy in a standing wave pattern of a predetermined order at a predetermined microwave frequency, each waveguide defining a seed viewing area in registry with a portion of the associated path of travel, said seed viewing area being of predetermined dimension in the direction of the path of travel on the order of the dimension of a seed for substantially resolving individual seeds as they pass along the portion of the path of travel in registry with the seed viewing area.

13. A monitoring system according to claim 12, said waveguide further including means defining openings for the passage of said path of travel therethrough, said openings being of predetermined dimension for substantially confining said microwave energy to said standing wave pattern in said waveguide.

14. A seed sensor according to claims 8, 9 or 12 wherein said seed viewing area is located in registry with substantially the entire cross-sectional dimension of said path of travel, thereby substantially eliminating blind spots of the seed sensor in the path of travel.

* * * * *